(12) United States Patent
Forrest et al.

(10) Patent No.: US 8,485,488 B2
(45) Date of Patent: Jul. 16, 2013

(54) LATCH ASSEMBLY FOR ADJUSTABLE LEGS

(75) Inventors: Earl David Forrest, Asheboro, NC (US); Andrew James Graff, Greensboro, NC (US)

(73) Assignee: Liberty Hardware Mfg. Corp., Winston-Salem, NC (US)

( * ) Notice: Subject to any disclaimer, the term of this patent is extended or adjusted under 35 U.S.C. 154(b) by 838 days.

(21) Appl. No.: 12/032,850

(22) Filed: Feb. 18, 2008

(65) Prior Publication Data

US 2009/0206226 A1     Aug. 20, 2009

(51) Int. Cl.
*F16M 11/00*     (2006.01)

(52) U.S. Cl.
USPC .......... 248/408; 248/407; 248/423; 248/409; 248/188.8; 248/354.1; 248/351

(58) Field of Classification Search
USPC .......... 248/407, 408, 423, 409, 440.1, 188.1, 248/188.2, 188.5, 188.8, 354.1, 354.3, 354.7, 248/351; 297/440.24; 292/338, 339, DIG. 15, 292/DIG. 60, 194, 219
See application file for complete search history.

(56) References Cited

U.S. PATENT DOCUMENTS

| 872,739 | A | * | 12/1907 | McDaniel | 297/4 |
|---|---|---|---|---|---|
| 880,063 | A | * | 2/1908 | Beilfuss | 248/188.5 |
| 2,586,724 | A | * | 2/1952 | Sannebeck | 108/138 |
| 3,177,035 | A | * | 4/1965 | Halstrick | 297/451.1 |
| 3,667,713 | A | * | 6/1972 | Clarke | 248/188.5 |
| 3,855,946 | A | * | 12/1974 | Bales | 108/147.21 |
| 4,586,399 | A | * | 5/1986 | Kassai | 74/551.3 |
| 4,669,755 | A | * | 6/1987 | Harris et al. | 285/7 |
| 4,830,035 | A | * | 5/1989 | Liu | 135/67 |
| 4,842,311 | A | * | 6/1989 | White | 292/85 |
| 5,251,940 | A | * | 10/1993 | DeMoss et al. | 285/87 |
| 5,599,066 | A | * | 2/1997 | Chih | 297/383 |
| 5,625,923 | A | * | 5/1997 | Huang | 16/429 |
| 6,032,914 | A | * | 3/2000 | Bastida | 248/354.1 |
| 6,347,777 | B1 | * | 2/2002 | Webber et al. | 248/354.1 |
| 6,431,607 | B1 | * | 8/2002 | Kittelmann et al. | 285/7 |
| 6,702,332 | B2 | * | 3/2004 | Young et al. | 285/7 |
| 6,832,784 | B1 | * | 12/2004 | Chen | 285/7 |
| 7,017,936 | B2 | * | 3/2006 | Huang | 280/642 |
| 7,097,380 | B2 | * | 8/2006 | Lee | 403/109.2 |
| 7,300,077 | B2 | * | 11/2007 | Tawara et al. | 285/417 |
| 7,494,161 | B2 | * | 2/2009 | Kanai et al. | 285/403 |
| 7,516,988 | B2 | * | 4/2009 | Lin | 285/7 |
| 7,959,191 | B2 | * | 6/2011 | Schouten | 285/298 |

* cited by examiner

*Primary Examiner* — Terrell McKinnon
*Assistant Examiner* — Michael McDuffie
(74) *Attorney, Agent, or Firm* — Carlson, Gaskey & Olds

(57) ABSTRACT

An adjustable leg for a device includes first and second legs telescopically received relative to one another. The second leg has multiple adjustment holes. An externally located lever is supported relative to the first leg. The lever cooperates with a detent received in one of the adjustment holes in a latched position in which the first and second legs are fixed relative to one another. The lever includes an area spaced from the detent that is rotatable about a pivot from the latch position to an unlatched position in which the detent is disposed outside one of the adjustment holes. In the unlatched position, movement of the first and second legs in an axial direction relative to one another is permitted.

20 Claims, 2 Drawing Sheets

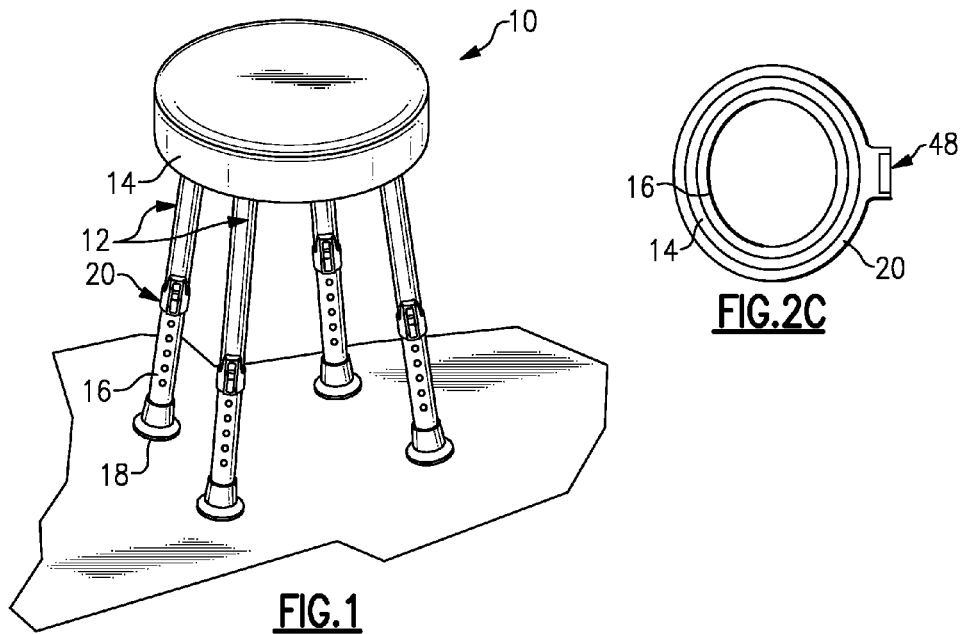
FIG.1
FIG.2C
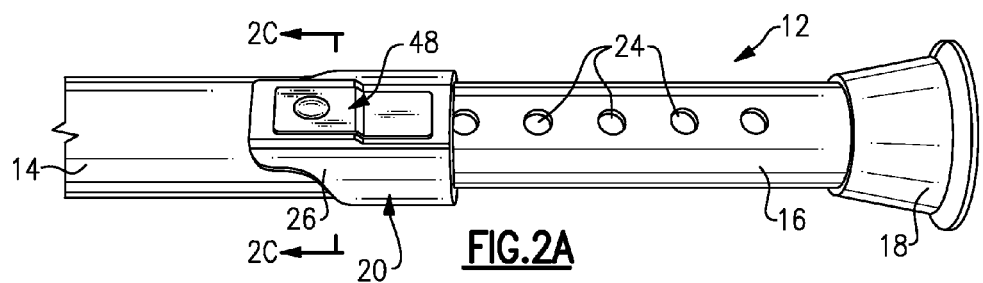
FIG.2A
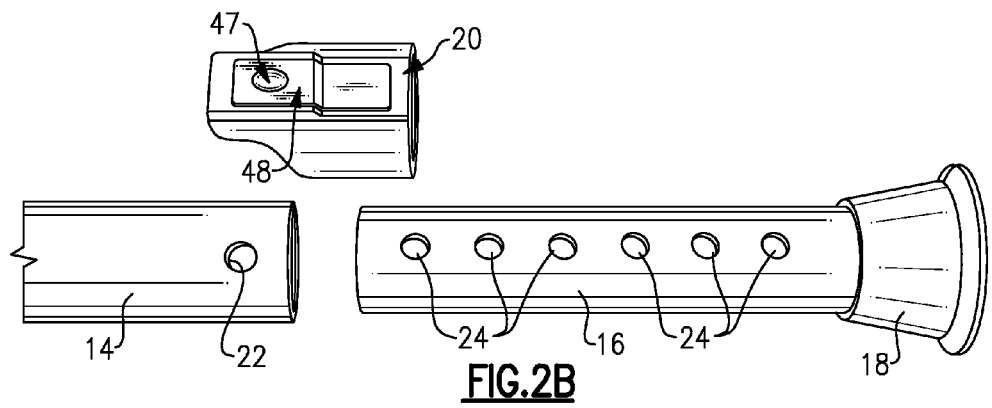
FIG.2B

LATCH ASSEMBLY FOR ADJUSTABLE LEGS

BACKGROUND

This disclosure relates to a latch assembly for adjustable legs used in such devices as walkers, safety seats, chairs, transfer benches and other medical assistance devices.

Devices such as walkers or seats often incorporate legs that are adjustable in length to enable selection of a desired height for the device. One type of adjustable leg configuration includes fixed and adjustable leg portions that are telescopically received relative to one another. In one example, the adjustable leg portion includes multiple adjustment holes that each correspond to a particular height. The adjustable holes enable this adjustable leg portion to be selectively moved relative to the fixed leg portion. In one example, the adjustable leg portion has a larger diameter than the fixed leg portion and is received over the fixed leg portion. An end of the adjustable leg portion includes a foot that engages the floor when the device is in use.

A compression spring is arranged within an inner diameter of the fixed leg portion. A detent is supported by the spring and extends through a hole in the fixed leg portion into one of the adjustment holes to provide the desired height. In order to adjust the length of the legs, a user must depress the small detent to force it out of the adjustment hole. This can be quite difficult because the forces must be concentrated on the very small area provided by the detent, which can be difficult for users with limited strength. In particular, those with rheumatoid arthritis and similar ailments have difficulty operating such prior art adjustment mechanisms. What is needed is a latch assembly for adjustable legs that requires less strength and is easier to operate.

SUMMARY

An adjustable leg for a device includes first and second legs telescopically received relative to one another. The second leg has multiple adjustment holes. An externally located lever is supported relative to the first leg. The lever cooperates with a detent received in one of the adjustment holes in a latched position in which the first and second legs are fixed relative to one another. The lever includes an area spaced from the detent that is rotatable about a pivot from the latch position to an unlatched position in which the detent is disposed outside one of the adjustment holes. In the unlatched position, movement of the first and second legs in an axial direction relative to one another is permitted.

In one example, the latch assembly includes a body having a pocket. The first leg is received in the pocket in one example. The lever is pivotally supported by the body and rotatable between the latched and unlatched positions about a pin. A spring biases the detent to the latched position. The detent extends into the pocket in the latched position and is disposed outside of the pocket in the unlatched position.

These and other features of the disclosure can be best understood from the following specification and drawings, the following of which is a brief description.

BRIEF DESCRIPTION OF THE DRAWINGS

FIG. 1 is a perspective view of an example device having adjustable legs with the disclosed latch assembly.

FIG. 2A is an elevational view of adjustable leg portions telescopically received to one another with the latch assembly maintaining the leg portions in a desired position.

FIG. 2B is an exploded view of the leg of FIG. 2A.

FIG. 2C is a cross-sectional view of the leg in FIG. 2A taken along lines 2C-2C.

DETAILED DESCRIPTION

Figure 3:
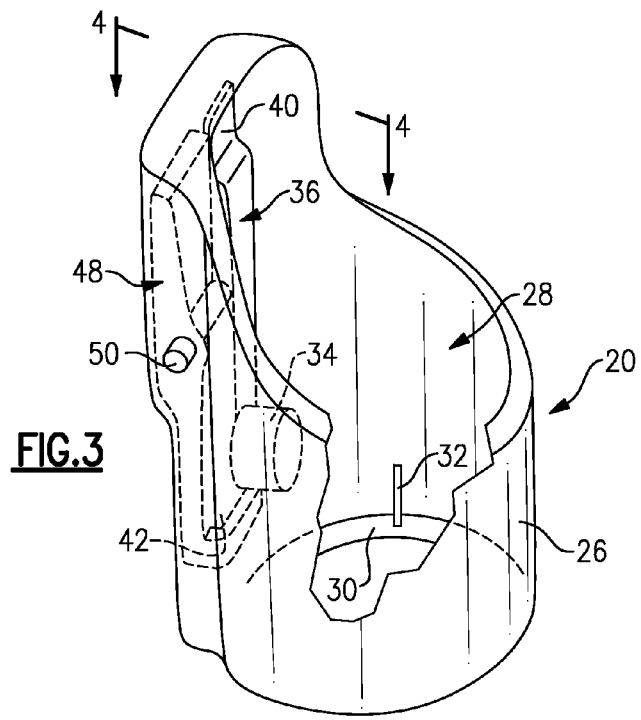
FIG. 3 is a partially broken, perspective view of the latch assembly.

A device 10 that utilizes adjustable legs 12 is shown in FIG. 1. The legs 12 include first and second leg portions 14, 16 that are telescopically received relative to one another to obtain a desired height. A latch assembly 20 selectively couples the first and second leg portions 14, 16 relative to one another in a desired position. An end 18 of the second portion 16 opposite the latch assembly 20 provides a foot configured to engage a surface of a floor. The end 18 can include a rubber cap to prevent slippage of the leg 12 relative to the floor.

Referring to FIG. 2A-2C, the first leg portion 14 has a larger diameter than the second leg portion 16 in the example. The latch assembly 20 is mounted on an end of the first leg portion 14. The first leg 14 includes a hole 22. Anti-rotation features between the first leg 14 and the latch assembly 20 maintain the latch assembly 20 in desired alignment with the hole 22. For example, as shown in FIG. 2C, the cross-sectional shape of the first and second legs 14, 16 and the latch assembly 20 are noncircular, e.g. oval or square, to prevent rotation between the components and ensure desired alignment.

The second leg portion 16 includes multiple adjustment holes 24. The overall height of the leg 12 is achieved by axially aligning one of the adjustment holes 24 with the hole 22 to achieve a desired height. A detent 34 is used to affix the first and second leg portions 14, 16 to one another when in a latched position, shown in FIGS. 3 and 4. The detent 34 is disposed within the hole 22 and the desired adjustment hole 24 in the latched position. As shown in FIG. 5, the detent 34 is disposed outside of the hole 22 and the adjustment holes 24 in the unlatched position.

Figure 4:
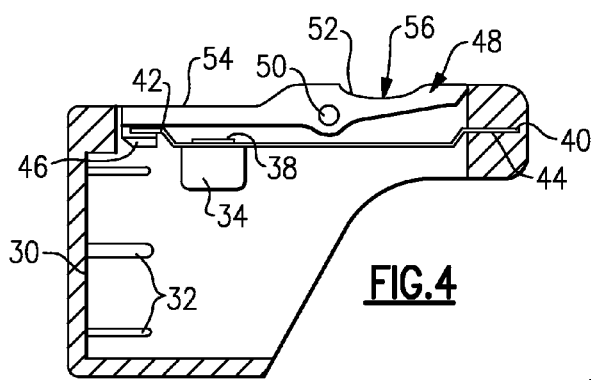
FIG. 4 is a cross-sectional view of the latch assembly taken along line 4-4 in FIG. 3 with the latch in a latched position.
Figure 5:
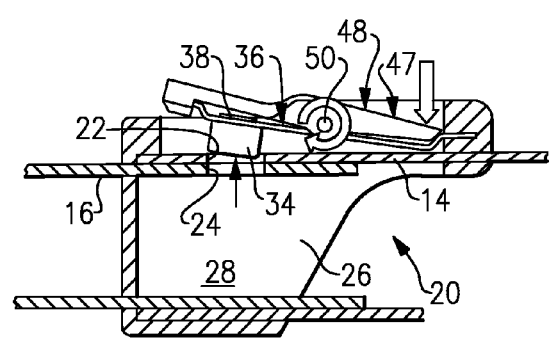
FIG. 5 is a cross-sectional view of the latch assembly with the lever in an unlatched position.

With continuing reference to FIGS. 3 and 4, the latch assembly 20 includes a body 26 that provides a pocket 28. The end of the first leg portion 14 is received in the pocket 28. The body 26 includes a lip 30 at one end that is in abutment with an edge of the first leg portion 14 when fully seated, which ensures that the detent 34 is axially aligned with the hole 22. Circumferentially arranged, axially extending ribs 32 within the pocket 28 securely retain the body 26 to the end of the first leg portion 14 in an interference fit relationship.

The detent 34 is secured to a spring 36 by a rivet 38, for example, as shown in FIG. 4. In one example, the spring 36 is a flat, stainless steel elongated member. A first end 40 of the spring 36 is received in a first slot 44 in the body 26. The spring 36 extends from the first end 40 to a second end 42. A lever 48 is rotationally supported relative to the body 26 by a pin 50 to provide a mechanical advantage in moving the detent 34. The second end 42 is received in a second slot 46 in the lever 48. The lever 48 is received in a recess 47 in the body 26 and is generally flush (i.e. in plane) with the body 26 in the latched position. The latch assembly 20 thus has a low profile, which prevents it from becoming caught by nearby items or from becoming inadvertently activated.

The lever 48 includes first and second exterior surfaces 52, 54 that are offset or uneven with one another. In one example, the first exterior surface 52 is at a greater radial distance from the first leg 14 than the second exterior surface 54. The detent 34 is arranged radially beneath the second exterior surface 54. The first exterior surface 52 includes a depression 56 corresponding to an area at which an operator can apply force to the lever 48 to rotate the detent 34 between the latched and unlatched positions. The large area makes it easy for an operator to apply the needed force to move the lever 48.

Although example embodiments have been disclosed, a worker of ordinary skill in this art would recognize that certain modifications would come within the scope of the claims. For that reason, the following claims should be studied to determine their true scope and content

What is claimed is:

1. A latch assembly for use with an adjustable leg comprising: a body including a pocket, said body having a first dimension portion and a second dimension portion, said body receiving a first leg within said first dimension portion the first dimension portion is greater than said second dimension portion, said body receiving a second leg within said second dimension portion wherein said second leg fits within said first leg, said pocket aligning with an opening in said first leg and an opening in said second leg, said body not attached to said first leg or said second leg, a lever pivotally supported by the body and rotatable between latched and unlatched positions, the lever including a detent that extends into the pocket in the latched position and is disposed outside of the pocket in the unlatched position and, a spring biasing the detent to the latched position the spring including a first end secured to the body and extending to a second end that is secured to the lever, wherein the spring extends in an axial direction, the lever rotatable about a pivot, and the detent is axially arranged on one side of the pivot, and the lever providing an area on the other side of the pivot that is configured to receive force to rotate the lever from the latched position to the unlatched position and wherein the detent is secured to the spring at a second end of the lever, the pivot arranged axially between the detent and the first end wherein the body includes a recess receiving the lever, wherein said lever area is flush in plane with said body in the latched position.

2. The latch assembly according to claim 1, wherein the pivot includes a pin extending through the body and the lever.

3. The adjustable leg according to claim 1, wherein the lever includes first and second exterior surfaces adjacent to one another on either side of the pivot, one of the exterior surfaces configured to a receive force to rotate the lever between the latched and unlatched positions.

4. The adjustable leg according to claim 3, wherein the first exterior surface is at a greater radial distance from the pocket than the second exterior surface with the first and second exterior surfaces that is uneven relative to one another in the latched position, the first exterior surface includes a depression providing an area configured to receive the force.

5. A latch assembly for use with an adjustable leg comprising:
a body including a pocket, said body having a first dimension portion and a second dimension portion, said body receiving a first leg within said first dimension portion the first dimension portion is greater than said second dimension portion, said body receiving a second leg within said second dimension portion wherein said second leg fits within said first leg, said pocket aligning with an opening in said first leg and an opening in said second leg, said body not attached to said first leg or said second leg,
a lever pivotally supported by a recess in the body and rotatable between latched and unlatched positions, the lever including a detent that extends into the pocket in the latched position and is disposed outside of the pocket in the unlatched position, said detent having a length for extending through said pocket and into said opening in said first leg and an opening in said second leg, and
a spring biasing the detent to the latched position the spring including a first end secured to the body and extending to a second end that is secured to the lever, wherein the spring extends in an axial direction, the lever rotatable about a pivot, and the detent is axially arranged on one side of the pivot, and the lever providing an area on the other side of the pivot that is configured to receive force to rotate the lever from the latched position to the unlatched position and wherein the detent is secured to the spring at a second end of the lever, the pivot arranged axially between the detent and the first end wherein said other side of the lever is flush in plane with said second dimension portion and said one side of said lever is in plane flush with said first dimension portion if said detent is disposed in said pocket.

6. A kit for an adjustable leg comprising:
a body having a first inner dimension portion and a second inner dimension portion that is greater than said first inner dimension and a first outer dimension portion and a second outer dimension portion that is greater than said first outer dimension portion, the body having a pocket receiving a detent;
a first leg having a first hole for receiving a said detent, said first leg fitting in one of said first inner dimension portion or said second inner dimension portion;
a lever pivotally supported by the body and rotatable between latched and unlatched positions, the lever including a detent that extends into the first hole in the latched position and is disposed outside of the first hole in the unlatched position; and
a spring biasing the detent to the latched position the spring including a first end secured to the body and extending to a second end that is secured to the lever, wherein the spring extends in an axial direction, the lever rotatable about a pivot, and the detent is axially arranged on one side of the pivot, and the lever providing an area on the other side of the pivot that is configured to receive force to rotate the lever from the latched position to the unlatched position and wherein the detent is secured to the spring at a second end of the lever, the pivot arranged axially between the detent and the first end wherein said other side of the lever is flush in plane with said second outer dimension portion and said one side of said lever is flush in plane with said first outer dimension portion if said detent is disposed in said first hole.

7. The kit of claim 6 further comprising;
a second leg having one or more second holes, wherein said detent extends through said first hole and one of said one or more second holes if said second leg is latched within said body.

8. The latch assembly of claim 5, wherein the first dimension portion is adjacent a first end of the body and the second dimension portion is adjacent a second opposite end of the body.

9. The latch assembly of claim 5, wherein the detent is attached to the spring.

10. The latch assembly of claim 5, wherein the first leg is configured to extend only partially through the body.

11. The latch assembly of claim 5, wherein body includes a stop for engaging an end portion of the first leg.

12. The latch assembly of claim 5, wherein the body includes a plurality of axial ribs for securing the body to the first leg.

13. The latch assembly of claim 5, wherein the lever is spaced inwardly of both axial ends of the body.

14. The latch assembly of claim 5, wherein said spring is located adjacent one of the first leg or the second leg.

15. The latch assembly of claim 6, wherein the first inner dimension portion is adjacent a first end of the body and the second inner dimension portion is adjacent a second opposite end of the body.

16. The latch assembly of claim 6, wherein the detent is attached to the spring.

17. The latch assembly of claim 6, wherein the first leg is configured to extend only partially through the body.

18. The latch assembly of claim 6, wherein body includes a stop for engaging an end portion of the first leg.

19. The latch assembly of claim 6, wherein the lever is spaced inwardly of both axial ends of the body.

20. The latch assembly of claim 6, wherein said spring is located adjacent one of the first leg or the second leg.

\* \* \* \* \*